United States Patent [19]

Lenart

[11] 4,410,991

[45] Oct. 18, 1983

[54] SUPERVISORY CONTROL APPARATUS

[75] Inventor: Joseph M. Lenart, Arlington, Mass.

[73] Assignee: GTE Laboratories Incorporated, Waltham, Mass.

[21] Appl. No.: 270,044

[22] Filed: Jun. 3, 1981

[51] Int. Cl.³ .............................................. G06F 11/00
[52] U.S. Cl. ....................................... 371/66; 371/25; 371/12
[58] Field of Search ............................ 371/25, 66, 12; 364/200, 900

[56] References Cited

U.S. PATENT DOCUMENTS

| 4,016,408 | 4/1977 | Koetzle | 371/66 |
| 4,072,852 | 2/1978 | Hogan et al. | 371/12 |
| 4,095,094 | 6/1978 | Struger et al. | 371/25 |
| 4,244,050 | 1/1981 | Weber et al. | 371/66 |
| 4,282,574 | 8/1981 | Yoshida et al. | 371/66 |
| 4,347,608 | 8/1982 | Appiano et al. | 371/25 |

OTHER PUBLICATIONS

Mano, M. Morris, *Computer System Architecture*, Prentice-Hall, Inc., Inglewood Cliffs, N.J., 1976.

*Primary Examiner*—Mark E. Nusbaum
*Assistant Examiner*—Michael R. Fleming
*Attorney, Agent, or Firm*—David M. Keay

[57] ABSTRACT

Apparatus for monitoring and controlling the operation of a program-controlled computer. The program causes the computer to produce a signature waveform characteristic of proper computer operation at a dedicated output. The presence or absence of this waveform indicates whether or not the computer is operating properly. The apparatus monitors this output and the power supply conditions applied to the computer. Whenever the power supply is operating outside of certain limits the apparatus produces a reset signal to the computer and a disable signal to any equipment which is being operated under control of the computer. If a malfunction occurs in the computer operation, the apparatus produces the disable signal and a reset pulse. If the malfunction is cleared during reset, the computer returns to normal operation upon termination of the reset pulse. If the malfunction is not cleared and the normal operation is not resumed upon termination of the reset pulse, the disable signal continues and no further reset pulses are initiated.

4 Claims, 4 Drawing Figures

SUPERVISORY CONTROL APPARATUS

BACKGROUND OF THE INVENTION

This invention relates to apparatus for monitoring and controlling the operation of program-controlled systems. More particularly, it is concerned with apparatus for monitoring the power supply conditions and operating state of a program-controlled computer.

Computers are being used increasingly to control the operation of various types of equipment. If a computer is caused to be in an improper, or undefined, operating state, improper operation of the equipment occurs which may lead to damage to the equipment or to material being processed by the equipment. An undefined state of the computer may be due to incorrect initialization of the computer hardware upon start-up. Improper power supply levels during powering-up, powering-down, and low line voltage conditions can cause the computer to operate in an undefined state. Problems may also occur because of failure in the computer hardware or because of other electrical noise or transients.

Presently known computer systems provide some protective features. For example, computer systems typically include hardware for generating a reset signal after application of power in order to insure proper initialization.

SUMMARY OF THE INVENTION

Apparatus for controlling the operation of a program-controlled computer system in accordance with the present invention provides for disabling the effects of the computer outputs whenever the system is in an undefined state. The apparatus generates reset signals for proper initialization after powering-up and to restore operation after a power supply failure or transient error. When the computer system is in an undefined state, the apparatus produces a signal which may be employed to set equipment being controlled in a particular defined state, for example, off. The program-controlled computer system produces a predetermined signal at an output connection during proper operation of the computer system.

The apparatus comprises power sensing means which produces a first output signal when the power supply conditions applied to the system are within predetermined limits and produces a second output signal when the power supply conditions are outside of those predetermined limits. A reset signal means operates to produce a reset signal to the system. The reset signal means has one input coupled to the power sensing means, another input, and an output coupled to the computer system. A detection means is coupled to the output connection of the computer system and produces a first signal condition when the predetermined signal is being produced by the computer system and a second signal condition when the predetermined signal is not being produced by the computer system. The apparatus also includes output enable means which has one input coupled to the power sensing means, another input coupled to the detection means, and an output connection. The output enable means produces a first output signal at its output connection only when the power sensing means is producing the first output signal and the detection means is producing the first signal condition. The output enable means operates to produce a second output signal when the power sensing means is producing its second output signal, and also operates to produce a second output signal when the detection means is producing its second signal condition.

A reset trigger means is coupled to the output connection of the output enable means and to the other input of the reset signal means. The reset trigger means produces an output signal at the other input of the reset signal means in response to a transition from the first to the second output signal from the output enable means. The reset signal means operates to produce the reset signal at its output in response to a second output signal from the power sensing means and also operates to produce the reset signal in response to an output signal from the reset trigger means. Thus, a reset signal is applied to the computer system and a second output signal is produced at the output connection of the output enable means when the power supply conditions are outside of the predetermined limits or when the computer system is not operating properly as indicated by the absence of the predetermined signal at the output connection of the computer system.

BRIEF DESCRIPTION OF THE DRAWINGS

In the drawings:

FIG. 4 is a diagram illustrating voltage levels at various points throughout the apparatus of FIG. 2 under various computer operating states.

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
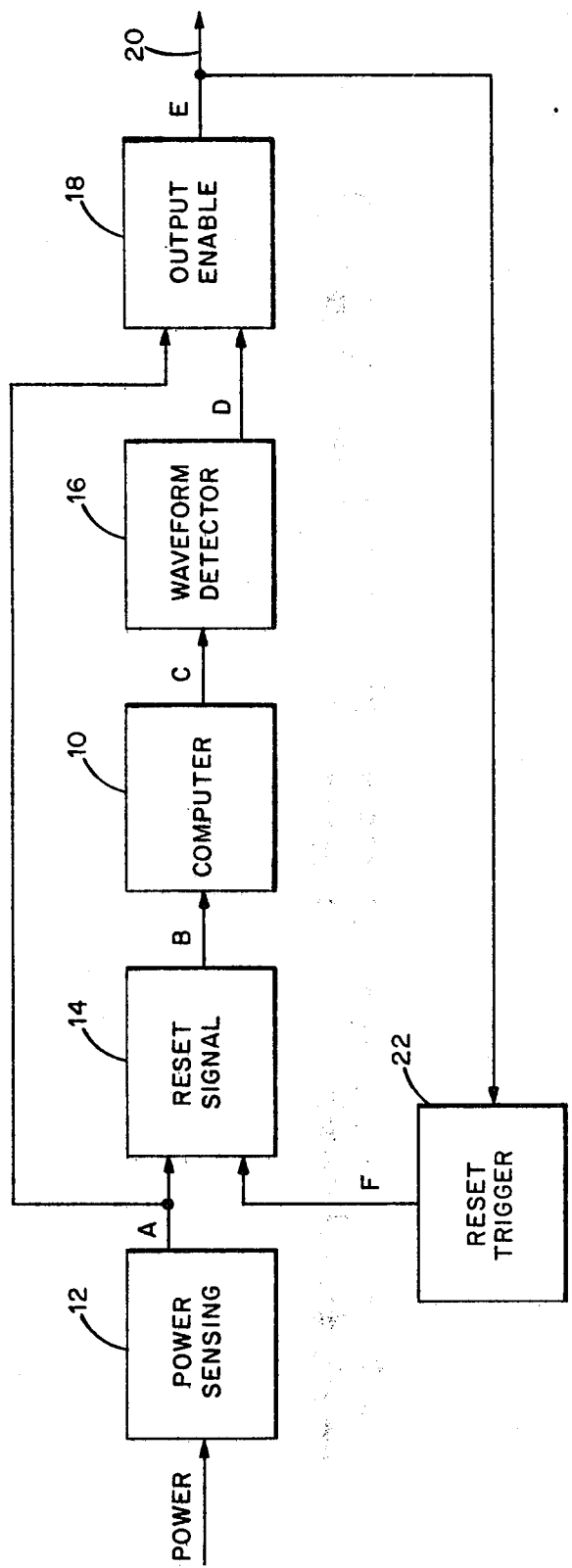
FIG. 1 is a block diagram illustrating apparatus in accordance with the present invention.

FIG. 1 is a block diagram illustrating apparatus in accordance with the present invention. The apparatus supervises and controls the operation of a computer 10 which may be any of various types of computers, microprocessors, or other program-controlled systems. The computer is operated so as to produce a signature waveform at a dedicated one of its output connections which is characteristic of proper computer operation. The computer 10 is held in a reset condition by a reset signal during which initialization occurs, such that upon termination of the reset signal the computer is in condition to operate properly under control of the stored program.

The apparatus includes a power sensing circuit 12 which is coupled to the power supply providing operating potentials to the computer 10. The power sensing circuit 12 monitors the power supply and produces one output signal when the power supply is operating satisfactorily within certain prescribed limits and another output signal when the power supply is not operating within the prescribed limits. The output of the power sensing circuit 12 is applied to a reset signal circuit 14. The reset signal circuit 14 has two inputs, one of which is connected to the output of the power sensing circuit 12. The reset signal circuit 14 produces a reset signal when particular conditions are present at either of its inputs. It continues to produce a reset signal for a reset hold period after termination of the particular input condition in order to insure sufficient time for proper initialization of the computer 10.

The output connection of the computer 10 which is dedicated to carrying the signature waveform indicating proper operation is connected to a waveform detector 16. The waveform detector 16 detects the signal from the computer 10 and produces an output condition indicating whether or not the signature waveform is present.

The apparatus also includes an output enable circuit 18 having one input from the power sensing circuit 12 and another from the waveform detector 16. When the power sensing circuit 12 produces an output signal indicating the power supply conditions are satisfactory and the waveform detector 16 produces an output condition indicating that the computer 10 is functioning properly, the output enable circuit 18 produces a signal at an output connection 20. This signal may be applied as an enabling signal to input/output modules to which the computer outputs are connected. If the outputs of either the power sensing circuit 12 or the waveform detector 16 indicate an unsatisfactory operating situation, the output enable circuit 18 produces a different signal condition at the output connection 20. This signal may be employed as a disabling signal to the input/output modules.

The output of the output enable circuit 18 is also connected to a reset trigger circuit 22. The reset trigger circuit produces a steady state output condition except in response to a transition from an enabling to a disabling signal at the output of the output enable circuit 18. In response to such a transition the reset trigger circuit 22 produces a momentary pulse at the other of the two inputs of the reset signal circuit 14. In response to this pulse the reset signal circuit 22 produces a reset signal to the computer 10. As stated previously the reset signal persists for a reset hold period after termination of the pulse sufficient to complete resetting of the computer.

Briefly, the apparatus operates in the following manner. During powering-up before the power supply is operating within the prescribed limits, the power sensing circuit 12 produces a signal to the reset signal circuit 14 causing the reset signal to be applied to computer 10 thus holding it in the reset condition. This signal from the power sensing circuit 12 is also applied to the output enable circuit 18 causing it to produce a disabling signal at the output connection 20. Since the waveform detector 16 fails to detect a signal indicating proper operation from the computer 10, its output also causes the output enable circuit 18 to produce a disabling signal.

When the power supply operates within the prescribed limits, the output from the power sensing circuit 12 changes causing the reset signal from reset signal circuit 14 to terminate after the reset hold period. Assuming that upon termination of the reset condition the computer 10 operates properly, the waveform detector 16 detects this situation and produces a suitable output signal. Since the signals to the output enable circuit 18 from the power sensing circuit 12 and the waveform detector 16 are both favorable, the output enable circuit produces an enabling signal at the output connection 20.

Any subsequent disruption of the power supply detected by the power sensing circuit 12 causes the apparatus to operate in a similar manner to prevent the computer 10 from functioning in an undefined state. Restoration of the power supply to satisfactory operation causes the apparatus to operate in the manner described to resume operation of the computer.

If during operation of the computer 10 under control of the stored program some error occurs for whatever reason, and the computer is in an undefined state, the waveform detector 16 responds by producing a signal to the output enable circuit 18. The output enable circuit 18 produces a disabling signal at the connection 20. The transition from the enabling to the disabling signal at the output of the output enable circuit 18 causes the reset trigger circuit 22 to produce a momentary pulse to the reset signal circuit 14. This pulse initiates a reset signal to the computer 10 which lasts for a fixed time. While the computer 10 is being held in the reset condition, the waveform detector 16 continues to apply a signal to the output enable circuit 18 which causes it to maintain the disabling signal at the output connection 20. If the error is cleared by resetting, then upon termination of the reset signal the computer 10 functions properly under control of the stored program. This situation is detected by the waveform detector 16 and its output condition causes the output enable circuit 18 to produce an enable signal at the connection 20. In the event the computer 10 does not restart properly after the reset signal, the waveform detector 16 continues to produce a signal which causes the output enable circuit 18 to maintain the disable signal at the output connection 20.

Figure 2:
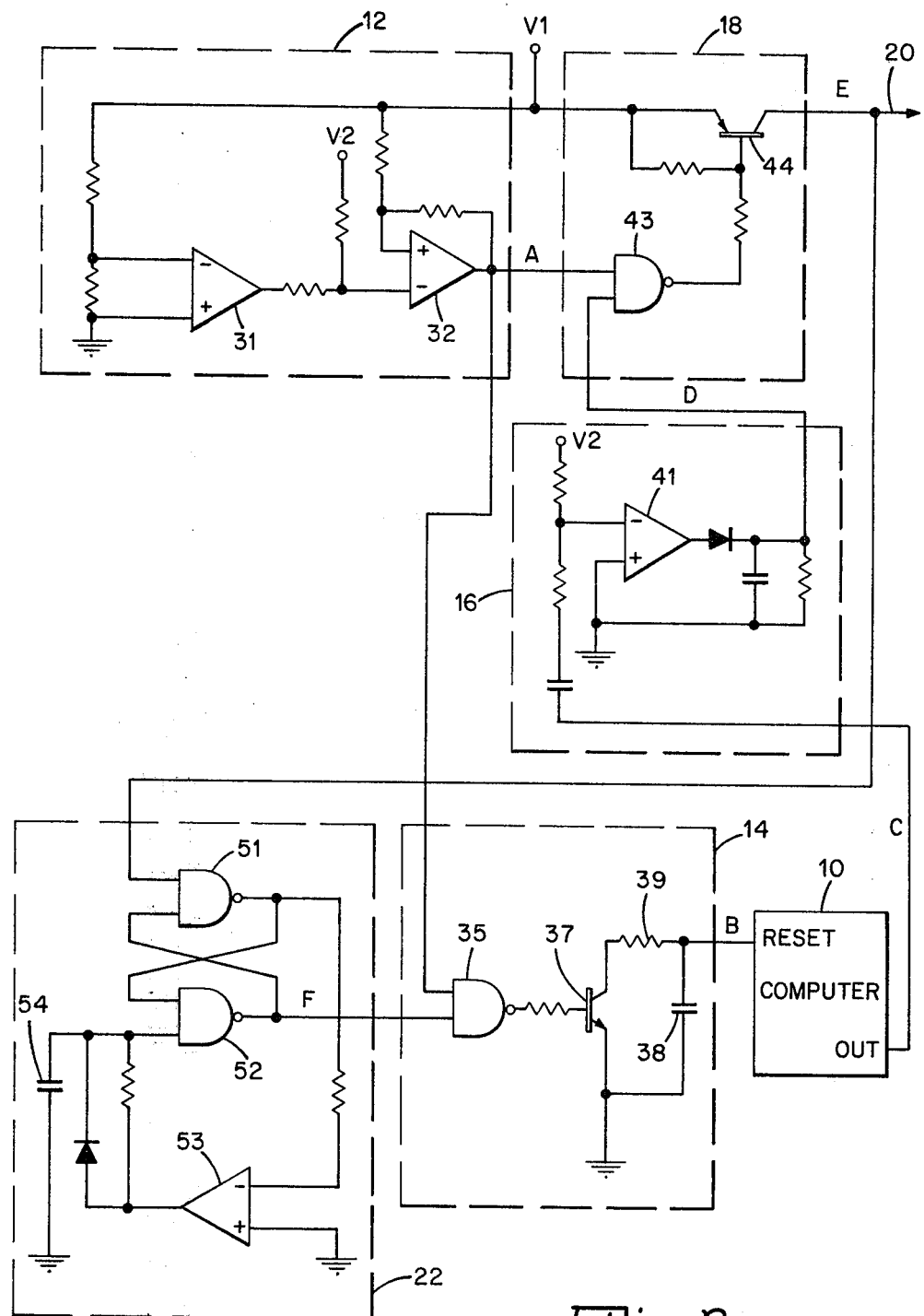
FIG. 2 is a schematic diagram of a specific embodiment of the apparatus of FIG. 1.

FIG. 2 is a schematic circuit diagram of a specific embodiment of apparatus as described hereinabove for providing supervisory control of an Intel 8039 programmable microprocessor, which is manufactured and sold by Intel Corporation. This microprocessor and instructions for its operation are described in detail in a publication of Intel Corporation entitled "MCS-48 User's Manual," April, 1979. The signal produced by the microprocessor for monitoring by the waveform detector 16 is a periodic waveform generated by three instructions of the time routine stored as firmware in the memory. Since the time routine updates the real time clock, it is critical to proper system operation. For the specific embodiment under discussion the time routine is executed every 20 milliseconds. The monitored output changes state each time the time routine is executed, thus producing a signature waveform which is a squarewave signal at a 25 Hz rate. The squarewave signal is produced at I/O bit 6 of port 2 of the 8039 microprocessor. The instruction codes for generating the squarewave signal are:

IN A, P2; read current I/O bit value
XRL A, #40H; complement I/O bit
OUTL P2, A; write new I/O bit value The power sensing circuit 12 monitors the levels of two operating potentials provided to operate the computer 10. Specifically, V1 is +8 volts DC unregulated and V2 is +5 volts DC regulated. The power sensing circuit includes two operational amplifiers 31 and 32 and resistances connected as shown. This arrangement depends on current flow through resistances to determine if the voltage levels of V1 and V2 are satisfactory. If both voltage levels are sufficiently high (for example, V1 above 7.5 volts and V2 above 4.0 volts), the output of the circuit at point A is high. If either or both of the voltage levels is low, the output at point A is low.

The reset signal circuit 14 includes a NAND gate 35 which has two inputs, one from the power sensing circuit 12 and the other from the reset trigger circuit 22.

The output of the NAND gate 35 is applied to the base of an NPN transistor 37. The collector of transistor 37 is connected through a resistance 39 to the reset input of the computer 10. A capacitance 38 is connected between the reset input and ground. When both of the inputs to the NAND gate 35 are high, its output is low biasing transistor 37 in a nonconducting condition. A charge is stored across capacitance 38 by current from a pull-up transistor in the computer holding the reset input at a high level. When either one of the inputs to the NAND gate 35 is low, the output of the NAND gate is high biasing transistor 37 to conduction and thereby discharging capacitance 38. Thus a low level reset signal is applied to the reset input of the computer 10 holding the computer in a reset condition. When both the inputs to NAND gate 35 become high, its output goes low biasing transistor 37 to nonconduction. Capacitance 38 is charged by current flow through resistance 39 from the pull-up transistor in the computer 10. The delay from the time the input to the NAND gate 35 becomes high to the time the capacitance 38 is charged sufficiently to terminate the reset condition is approximately 100 milliseconds.

The waveform detector 16 which is connected to the dedicated output of the computer 10 is a conventional circuit for detecting the presence or absence of a periodic squarewave. The circuit includes an operational amplifier 41 with appropriate resistance and capacitance components connected at its input and output. The circuit produces a continuous high output level when the waveform being received is a squarewave of approximately the correct frequency, and produces a low output level signal when the appropriate signature waveform is not being received from the computer.

The output enable circuit 18 includes a NAND gate 43 having one input connected to the output from the power sensing circuit 12 and another input connected to the output from the waveform detector 16. The output of the NAND gate 43 is coupled to the base of a PNP power transistor 44. The collector of the transistor 44 is connected to the enable output connection 20. The combination of the NAND gate 43 and the transistor 44 functions as a logic AND gate such that when both the inputs to the NAND gate 43 are high, the output at connection 20 is high, and if either or both of the outputs to the NAND gate 43 is low, the output at connection 20 is low.

The output from the output enable circuit 18 is also coupled to the reset trigger circuit 22. The reset trigger circuit 22 includes two NAND gates 51 and 52 cross-connected to form a flip-flop circuit. The output from the output enable circuit 18 is applied to one of the inputs of NAND gate 51. The output of NAND gate 51 is coupled to an input of NAND gate 52 by an arrangement including an operational amplifier 53. A capacitance 54 is connected between that input and ground. Under steady state conditions regardless of the input level to NAND gate 51 the output of the reset trigger circuit 22 taken at the output of NAND gate 52 is high. In response to a high to low transition at the input of NAND gate 51 a momentary negative-going pulse (approximately 10 milliseconds in duration) is produced at the output of NAND gate 52. This output is coupled to the other input to the NAND gate 35 of the reset signal circuit 14.

Figure 3:
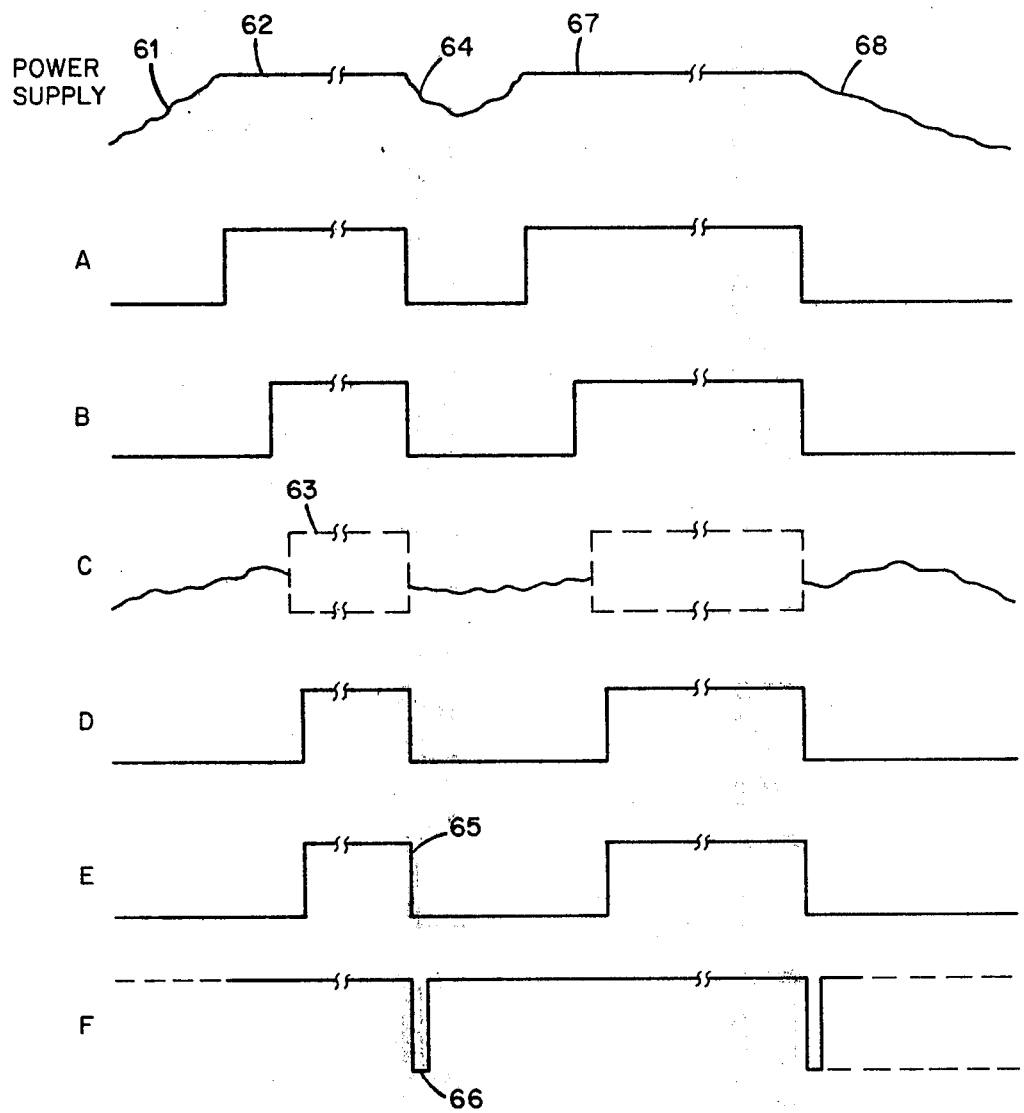
FIG. 3 is a diagram illustrating voltage levels at various points throughout the apparatus of FIG. 2 in response to various power supply conditions.

FIG. 3 illustrates the voltage levels at certain points A through F throughout the apparatus under various power supply situations as indicated by the first curve of FIG. 3. During the powering-up period 61 of the power supply, the output A of the power sensing circuit 12 is low. Thus the reset signal B from the reset signal circuit 14 is also low. The outputs of the computer 10 including the monitored output C are undefined. Thus the output of the waveform detector 16 is low. The low output A from the power sensing circuit 12 causes the output E of the output enable circuit to be low providing a disable signal to any equipment connected thereto.

When the power supply levels are within prescribed limits as indicated at 62, the output A of the power sensing circuit 12 becomes high. Because of the delay in the reset signal circuit 14, the low reset signal B continues for a reset hold period holding the computer 10 in the reset condition. Assuming proper initialization of the system during the reset signal, shortly after termination of the reset signal B the computer 10 begins proper operation under control of the stored program. The computer 10 operates to produce a signature waveform to be monitored as indicated at 63, specifically a squarewave signal as described hereinabove. The waveform detector 16 detects the presence of this signal and its output D is high. The combination of high input levels A and D to the output enable circuit 18 causes its output E to be high thus enabling any equipment coupled to the output enable connection 20.

In response to a temporary failure of the power supply to operate within the prescribed limits as indicated at 64, the output A of the power sensing circuit 12 becomes low causing a reset signal B to be produced by the reset signal circuit 14. Since the monitored output C of the computer 10 is indeterminate while the computer 10 is in a reset condition, the waveform detector 16 produces an output D which is low. The output enable circuit 18 responds to a low level at either input A or D to produce a low level disable signal E at the output enable connection 20. In response to the transition 65 of the output enable signal E from high to low, the reset trigger circuit 22 produces a momentary negative-going pulse 66. However, operation of the apparatus is being controlled by the low output A from the power sensing circuit 12 and the pulse 66 is of no effect.

Upon restoration of the power supply to proper operation as indicated at 67, the output A of the power sensing circuit 12 becomes high. After the reset hold period the output B of the reset signal circuit 14 becomes high terminating the reset condition of the computer 10. If proper initialization has occurred during the reset period, the computer 10 and the remainder of the apparatus responds as described previously to resume normal steady state operation. When the power supply is turned off as indicated at 68, the output A of the power sensing circuit 12 immediately becomes low, and the apparatus responds as explained previously to shut down and produce a disable signal E at the enable output connection 20.

Figure 4:
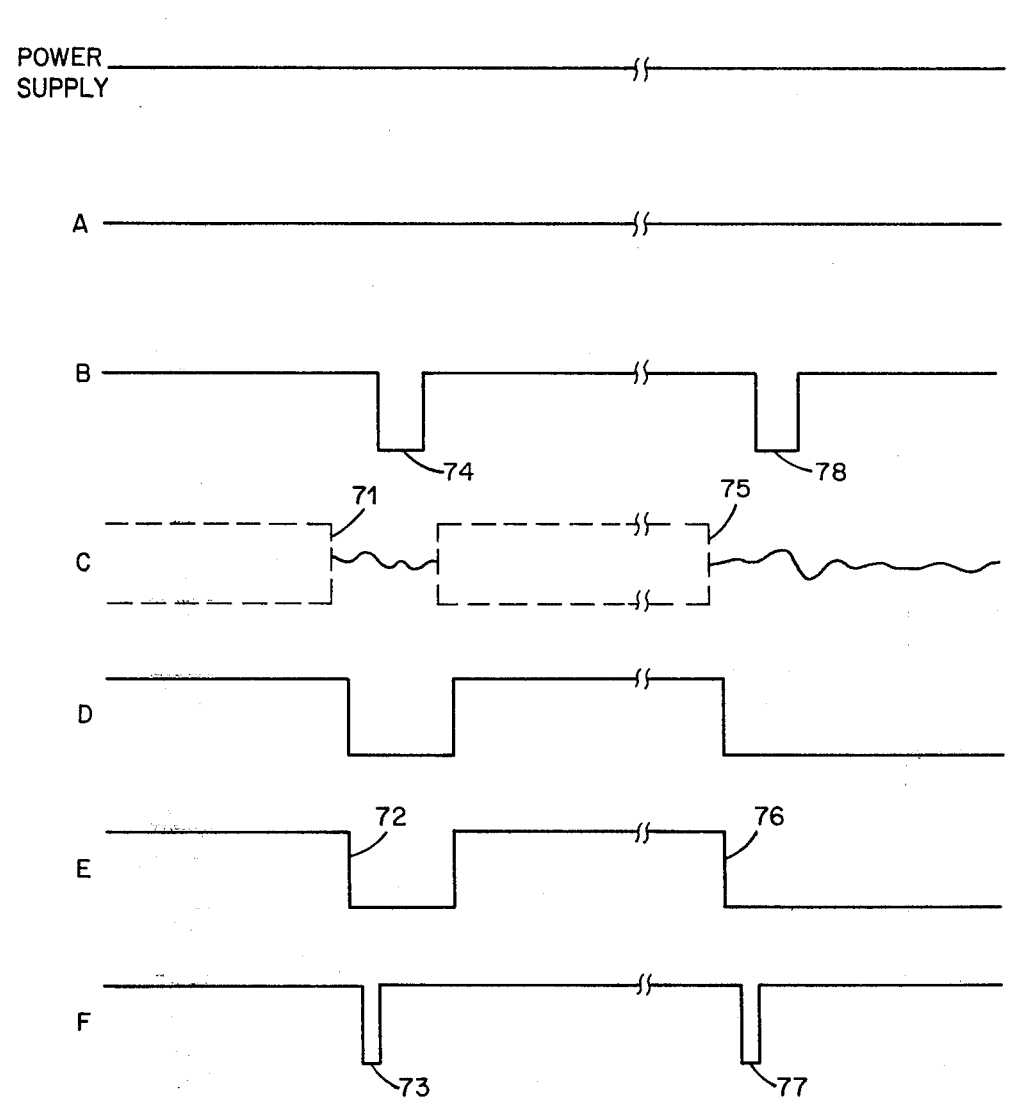

FIG. 4 illustrates operation of the apparatus assuming satisfactory functioning of the power supply whereby the output A of the power sensing circuit 12 remains high. It is assumed that the computer 10 is operating satisfactorily under control of the stored program when a malfunction occurs. As indicated at 71 the monitored output C becomes indeterminate, and the waveform detector 16 detecting the absence of the proper signal produces a low output signal D. This low input to the output enable circuit 18 causes its output E to become low providing a disable signal at the output enable connection 20. The transition 72 of the output signal E is applied to the reset trigger circuit 22 causing the reset trigger circuit to produce a momentary negative-going pulse 73 to the reset signal circuit 14. The reset signal circuit produces a low level reset signal B forcing the computer 10 to the reset condition. The reset signal is a pulse 74 which starts subsequent to termination of proper computer operation, as indicated at 71, due to propagation delays throughout the apparatus and lasts for the reset hold period. It is assumed that during the reset signal 74 the malfunction has been cleared and proper initialization of the computer 10 has taken place. Then, upon termination of the reset condition, the output of the computer 10 including the monitored output C is proper. The signature waveform is detected by the waveform detector 16 causing its output D to be high. The signal E at the output connection 20 of the output enable circuit 18 goes high. Thus, the entire system is returned to normal steady state operation.

Another malfunction is assumed to occur as indicated at 75 causing the monitored output C of the computer 10 to be indefinite. The output D of the waveform detector 16 goes low causing the output E of the output enable circuit 18 also to become low. The transition 76 from high to low of the output enable signal E causes the reset trigger circuit 22 to produce a momentary pulse 77 triggering the reset signal circuit 14 to produce a reset pulse 78 for the reset hold period. If during the reset pulse 78 the malfunction has not been cleared, then the monitored output C of the computer 10 remains indeterminate. The output D of the waveform detector 16 remains low causing the output E of the output enable circuit 18 also to remain low. Thus as the computer 10 continues to operate in an indeterminate manner, the disable signal E continues to be produced at the output enable connection 20.

Thus, while there has been shown and described what is considered a preferred embodiment of the present invention, it will be obvious to those skilled in the art that various changes and modifications may be made therein without departing from the invention as defined by the appended claims.

What is claimed is:

1. Apparatus for controlling the operation of a program-controlled computer system, said computer system producing a predetermined signal at an output connection during proper operation of the computer system and said computer system being held in a reset condition during a reset signal applied to said computer system, said apparatus comprising power sensing means, said power sensing means being operable to produce a first output signal when power supply conditions applied to the computer system are within predetermined limits, and said power sensing means being operable to produce a second output signal when power supply conditions applied to the computer system are outside of said predetermined limits;

reset signal means for producing a reset signal to said computer system; said reset signal means having one input coupled to the power sensing means, another input, and an output coupled to the computer system;

detection means coupled to the said output connection of the computer system, said detection means being operable to produce a first signal condition when said predetermined signal is being produced by the computer system, and said detection means being operable to produce a second signal condition when said predetermined signal is not being produced by the computer system;

output enable means having one input coupled to said power sensing means, another input coupled to said detection means, and an output connection; said output enable means being operable to produce a first output signal at its output connection only when said power sensing means is producing said first output signal and said detection means is producing said first signal condition; said output enable means being operable to produce a second output signal at its output connection when said power sensing means is producing said second output signal; and said output enable means being operable to produce said second output signal at its output connection when said detection means is producing said second signal condition;

reset trigger means coupled to the output connection of the output enable means and to said another input of the reset signal means; said reset trigger means being operable to produce an output signal at said another input of the reset signal means in response to a transition from the first to the second output signal from said output enable means;

said reset signal means being operable to produce a reset signal at the output thereof in response to a second output signal from said power sensing means, and said reset signal means being operable to produce a reset signal at the output thereof in response to said output signal from said reset trigger means;

said reset signal means being operable to produce said reset signal for a predetermined period of time subsequent to termination of said second output signal from the power sensing means at the one input of said reset signal means, and said reset signal means being operable to produce said reset signal for said predetermined period of time subsequent to said output signal from the reset trigger means at the other input of said reset signal means;

whereby a reset signal is applied to said computer system and a second output signal is produced at the output connection of the output enable means while the power supply conditions applied to the computer system are outside of said predetermined limits and for a predetermined period of time subsequent to the power supply conditions being restored to within said predetermined limits, and whereby a reset signal is applied to said computer system for said predetermined period of time and a second output signal is continuously produced at the output connection of the ouput enable means when the computer system is not operating properly as indicated by the absence of said predetermined signal at said output connection of the computer system.

2. Apparatus in accordance with claim 1 wherein
said reset trigger means is operable to produce a momentary pulse at the other input of the reset signal means in response to a transition from the first to the second output signal from said output enable means; and said reset signal means is operable to produce said reset signal for said predetermined period of time subsequent to termination of said momentary pulse from the reset trigger means at said another input of said reset signal means while said first output signal from the power sensing means is present at the one input of said reset signal means.

3. Apparatus in accordance with claim 2 wherein said power sensing means is coupled to two sources of operating potential, said power sensing means being operable to produce said first output signal when the potential of one of said sources is above a first predetermined level and the potential of the other of the said sources is above a second predetermined level, said power sensing means being operable to produce said second output signal when the potential of said one of said sources is below said first predetermined level, and said power sensing means being operable to produce said second output signal when the potential of said other of said sources is below said second predetermined level.

4. Apparatus in accordance with claim 3 wherein
said predetermined signal produced by the computer system is a periodic signal generated by a periodic time routine function programmed in the computer system for controlling timing of the computer system operation; and said detection means is operable to detect said periodic signal; and said detection means is operable to produce said first signal condition when said periodic signal is being detected and said detection means is operable to produce said second signal condition when said periodic signal is not being detected.

* * * * *